United States Patent [19]

Sorathia et al.

[11] Patent Number: 5,236,773

[45] Date of Patent: Aug. 17, 1993

US005236773A

[54] FIRE-RESISTANT BARRIERS FOR COMPOSITE MATERIALS

[75] Inventors: Usman A. K. Sorathia, Arnold; Vincent Castelli, Severna Park, both of Md.

[73] Assignee: The United States of America as represented by the Secretary of the Navy, Washington, D.C.

[21] Appl. No.: 783,039

[22] Filed: Oct. 25, 1991

[51] Int. Cl.$^5$ ............................................. B32B 9/00
[52] U.S. Cl. ..................................... 428/213; 428/457; 428/472; 428/697; 428/701; 428/702; 428/920; 428/921
[58] Field of Search ............... 428/921, 920, 697, 701, 428/702, 216, 472, 213, 457

[56] References Cited

U.S. PATENT DOCUMENTS

| | | | |
|---|---|---|---|
| 3,676,362 | 7/1972 | Yates | 252/309 |
| 4,001,126 | 1/1977 | Marion et al. | 428/921 |
| 4,122,203 | 10/1978 | Stahl | 428/309 |
| 4,265,953 | 5/1981 | Close | 428/920 |
| 4,381,716 | 5/1983 | Hastings et al. | 428/921 |
| 4,530,909 | 7/1985 | Makishima | 501/73 |
| 4,657,809 | 4/1987 | Eskind | 428/304.4 |
| 4,769,179 | 9/1988 | Kato | 252/609 |
| 4,774,150 | 9/1988 | Amano et al. | 428/701 |
| 4,859,365 | 8/1989 | Peninger | 252/601 |
| 4,871,694 | 10/1989 | Legare | 501/39 |
| 4,879,066 | 11/1989 | Crompton | 252/606 |
| 5,032,441 | 7/1991 | Ten Eyck et al. | 428/921 |

*Primary Examiner*—A. A. Turner
*Attorney, Agent, or Firm*—Luther Marsh; Gary G. Borda

[57] ABSTRACT

Fiber-reinforced plastic composite materials are fire-protected by the application thereon of a combination of coatings comprising a ceramic coating and an intumescent coating. The ceramic coating consists of zirconia stabilized with yttria.

1 Claim, No Drawings

FIRE-RESISTANT BARRIERS FOR COMPOSITE MATERIALS

The invention described herein may be manufactured and used by or for the Government of the United States for governmental purposes without the payment of any royalties thereon or therefor.

BACKGROUND OF THE INVENTION

1. Field of Invention

This invention relates to fire-resistant barriers for composite materials. More specifically, it relates to fire-resistant barriers comprising ceramic coatings in combination with intumescent coatings to provide fire protection for polymeric materials reinforced with glass or graphite fibers.

2. Description of the Prior Art

Fire-resistant barriers are known to the art. Well known fire resistant barrier materials include ceramic fabrics, ceramic coatings and intumescent coatings. Ceramic fabrics, such as Nextel (a product of the 3M Company) and Siltemp (a product of Ametek, Haveg Division) are commercially available. Intumescent coatings, when exposed to a flame, expand into thermally stable foam by the gas generated by the coating, such foam providing thermal insulation. Intumescent coatings, such as Nelson 100 Firestop (a product of Nelson Electric, a unit of General Signal of Tulsa, Okla.) and Ocean 9788 (a product of Ocean Coatings of Savannah, Ga.), are commercially available Metco 202 (a product of METCO, Inc. of Westbury, Long Island, N.Y.) is a commercially available yttria stabilized zirconia ceramic coating having a composition of 7–8% yttria with the balance being zirconia.

U.S. Pat. No. 3,676,362 describes fire resistant barriers in which the oxides of antimony, tin, titanium, or zirconium are incorporated in colloidal form into organic polymeric material.

U.S. Pat. No. 4,122,203 discloses fire protective barriers for foam plastics comprising a thermosetting synthetic resin in which is dispersed an effective amount of hydrated magnesium sulfate and, optionally, inert inorganic fillers and pigments.

U.S. Pat. No. 4,530,909 describes aluminosilicate glass containing rare earth oxides, particularly yttrium oxide.

U.S. Pat. No. 4,657,809 describes a fire retardant composition for foamed and fibrous substrates comprising a halogen-containing vinyl polymer, a fume-limiting metal oxide, and an afterglow-limiting compound selected from halogenated oils and fats, organo phosphonates, halogenated organo phosphonates, and substituted organo phosphonates.

U.S. Pat. No. 4,769,179 provides a flame-retardant resin composition comprising a halogen-free polymeric resin, a hydrated metallic oxide, and a phosphorous-containing titanate coupling agent.

U.S. Pat. No. 4,859,365 describes a flame retardant and smoke suppressant composition comprising an unsaturated polyester resin, an unsaturated monomer compatible with the polyester resin, antimony oxide, iron oxide, hydrated alumina, and trialkyl phosphate.

U.S. Pat. No. 4,871,694 describes a fire barrier material made by formation of a silicate gel material from alkali metal halides or nitrates and potassium or sodium silicate.

U.S. Pat. No. 4,879,066 discloses a composition comprising frits of different melting temperatures and one or more ceramic or basalt or intumescent substance, including phenolic and polyester resins and sodium silicate.

SUMMARY OF THE INVENTION

Fiber-reinforced plastic composite materials are being used to an increasing extent as replacements for steel because of the advantages of lighter weight, improved corrosion resistance, and reduced maintenance requirements, both in civilian and in military applications. Matrix resins used in such composites include polyesters, epoxy resins, phenolic resins, bismaleimides, and polyphenylene sulfides. Reinforcing materials include glass fiber, carbon fiber, Kevlar fiber, and Spectra fiber.

The principal disadvantage of the use of composite materials comprising organic polymers is the fact that when they are heated to their ignition temperature by heat transfer from a near-by flame, they ignite, support combustion, and evolve large quantities of smoke while burning. There is a need therefore for coatings or barriers which, when applied to organic polymeric materials, including glass or carbon fiber-reinforced plastic composites, decrease the rate of heat transfer from nearby flames, thus increasing fire resistance, reducing ignitability and smoke evolution during combustion, and reducing the toxicity of the smoke thus evolved. Such coatings further protect the substrates by delaying the onset of ignition and allowing more time for firefighting efforts.

Fire-resistant barrier materials include ceramic fabrics, ceramic coatings, and intumescent (swelling) coatings.

Fire resistance is experimentally determined by a series of standard test procedures: Smoke Generation and Combustion Gas Products, ASTM E-662; and Residual Flexural Strength, ASTM D-790; which are incorporated herein by reference.

It has now been found that a combination of a ceramic coating and an intumescent coating provides effective fire resistance when applied to fiber-reinforced plastic composite materials.

DESCRIPTION OF PREFERRED EMBODIMENT

The present invention is a multilayer fire-resistant barrier material for composite material structures and a fire-resistant structure comprising a multilayer fire resistant barrier material over a composite material substrate. The invention involves the use of a sprayable ceramic coating in combination with a sprayable intumescent coating to provide superior fire protection to fiber-reinforced plastic composite structures by decreasing the rate of heat transferred to the composite structure from near-by flames. The total thickness of the multilayer fire-resistant barrier material of the present invention should be sufficient to provide an effective thermal barrier effect. In an exemplary embodiment, the hybrid fire-resistant barrier material of the present invention comprises a bond coating of zinc sprayed onto a composite material substrate from an arc wire to a thickness of 2–3 mils, plasma-sprayed zirconia stabilized with yttria (e.g., Metco 202), to a thickness of 3–10 mils, preferably 5–7 mils, and an intumescent coating such as Nelson 100, applied to a thickness of 10–40 mils, preferably about 30 mils, with a paint spray gun. Metco 202 is made of zirconia stabilized against cracking with 7–8% by weight of yttria. One example of a composite material in accordance with the present invention is a fiber-reinforced plastic composite material. Examples of matrix resins used in such composite materials include polyesters, epoxy resins, phenolic resins, bismaleimides, and polyphenylene sulfides. Examples of reinforcing fibers used in such composite materials include glass fibers, carbon fibers, and Kevlar fibers.

The following tables summarize test results showing the superior performance of the hydrid coatings of this invention in a number of ASTM tests. The following abbreviations are used:

Gl/VE: glass fiber reinforced vinyl ester resin composite
Gr/EP: graphite fiber reinforced epoxy resin composite
Gr/VE: graphite fiber reinforced vinyl ester resin composite
Ds(300 sec): specific optical density at 300 seconds
Dm: maximum optical density during test
t100: time in minutes to reach optical density 100
Control: no coating
Ceramic: ceramic coating only
Int.: intumescent coating only
Hybrid: hybrid coating in accordance with this invention
%R.S.R.: percent residual strength retained
NI: not ignited

TABLE 1

| | Smoke and Gas Generation (ASTM E-662) | | | | | |
|---|---|---|---|---|---|---|
| | Gl/VE | | | Gr/EP | | |
| Composite | Ds (300 sec) | Dm | t100 (mins) | Ds (300 sec) | Dm | t100 (mins) |
| Control | 463 | 576 | 2 | 75 | 191 | 6 |
| Ceramic | 2 | 214 | 8 | 2 | 249 | 10 |
| Int. | 56 | 143 | 13 | 76 | 106 | 9.5 |
| Hybrid | 42 | 117 | 18 | 67 | 211 | 6.5 |

A specific optical density at 300 seconds of less than 100 is desirable; at smoke densities below 100, exit signs are visible. The time required to reach an optical density of 100 should be a great as possible. It is apparent that the hybrid coating of the present invention produces both a low optical density after 300 seconds and requires a long time to reach an optical density of 100, when applied to glass-reinforced vinyl ester.

The flexural strength of samples of composite materials after exposure to a radiant heat flux of 25 kilowatts/square meter for 20 minutes was used as a measure of retention of mechanical integrity. Table 2 summarizes representative test results.

TABLE 2

| Residual Flexural Strength (ASTM D-790) (% R.S.R.) | | |
|---|---|---|
| Substrate | Gl/VE | Gr/VE |
| Control | 14 | 0 |
| Ceramic | 28 | 13 |
| Int. | 45 | 77 |
| Hybrid | 40 | 14 |

It is apparent that the hybrid coating of this invention produces an improvement in residual flexural strength after exposure to radiant heat flux.

Ignitability was determined in terms of the time required to reach ignition under three different levels of radiant heat flux. Representative test results are presented in Table 3.

TABLE 3

| | Ignitability (Time to Ignition in Seconds) | | | | | |
|---|---|---|---|---|---|---|
| Substrate | Gl/VE | | | Gr/EP | | |
| Radiant heat flux, kW/m2 | 25 | 75 | 100 | 25 | 75 | 100 |
| Control | 281 | 22 | 11 | NI | 53 | 28 |
| Ceramic | NI | 88 | 48 | NI | 145 | 84 |
| Int. | NI | 450 | 248 | NI | 628 | 228 |
| Hybrid | NI | 445 | 275 | NI | 264 | 175 |

It is apparent that with the hybrid coating of this invention, the time required for the composite material to ignite at different radiant heat fluxes is substantially increased.

Other modifications of this invention will be apparent to those skilled in the art, all falling within the scope of the invention as described herein and claimed in the following claims.

What is claimed is:

1. A fire-resistant structure, comprising:
   a multilayer fire-resistant barrier material over a fiber-reinforced plastic composite material substrate;
   said multilayer fire-resistant barrier material being comprised of a first bond coating layer, an intermediate ceramic coating layer, and an outer intumescent coating layer;
   said bond coating layer comprising zinc being from about 2 to about 3 mils thick;
   said ceramic coating layer comprising zirconia stabilized with approximately 7 to 8% yttria, said yttria stabilized zirconia being from about 3 to about 10 mils thick; and
   said intumescent coating layer being from about 10 to about 40 mils thick, wherein said multilayer fire-resistant barrier material effectively decreases the rate of heat transferred to said fiber-reinforced plastic composite material substrate.

* * * * *